W. Bellamy,
Ice Pitcher.
No. 94,550.    Patented Sep. 7, 1869.
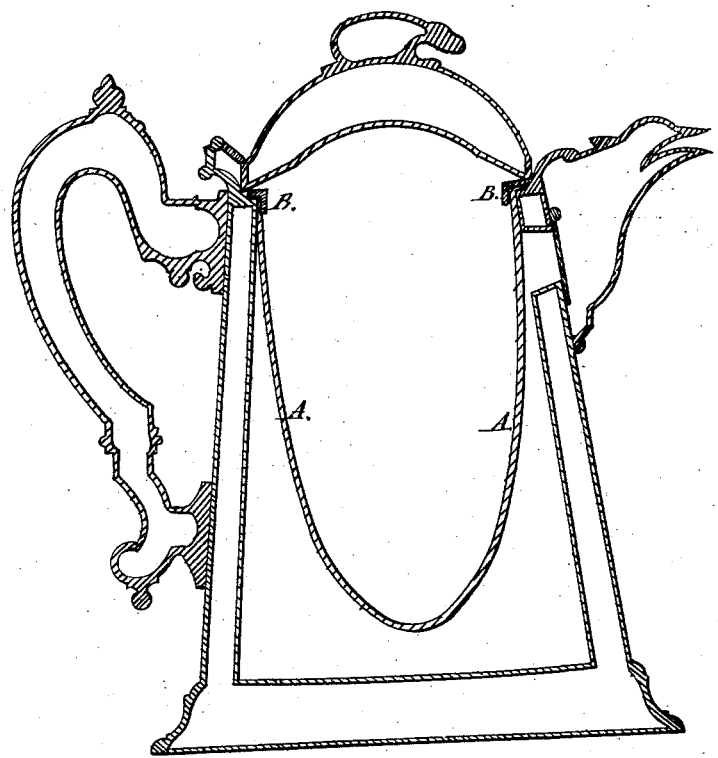
WITNESSES:
Michael Conroy
John Davidson
INVENTOR:
William Bellamy

United States Patent Office.

WILLIAM BELLAMY, OF NEWARK, NEW JERSEY.

Letters Patent No. 94,550, dated September 7, 1869.

IMPROVEMENT IN ICE-PITCHERS.

The Schedule referred to in these Letters Patent and making part of the same.

*To all whom it may concern:*

Be it known that I, WILLIAM BELLAMY, of the city of Newark, and State of New Jersey, have invented a new and useful Improvement in Ice-Pitchers; and I do hereby declare that the following is a full and exact description thereof, reference being had to the accompanying drawings, and to the letters of reference marked thereon.

The object of my invention is to protect the interior of an ice-pitcher from contact with the ice, and secure perfect filtration with economy of ice-waste.

The nature of my invention consists in suspending in the pitcher a receptacle of felt or other porous material, into which the ice is put, as shown at A, which is a cross-section of the felt receptacle.

This receptacle is attached to a flanch, B, which is fitted in the throat of the pitcher, so as not to interfere with the closing of lid.

The walls and bottom of the pitcher are securely protected from rough contact with the ice by the interposition of the felt, while the slow percolation of the fluid through it insures a corresponding slow waste of the ice, and, consequently, a more palatable and hygienic temperature of the water.

What I claim as my invention, and desire to secure by Letters Patent, is—

In combination with an ice-pitcher, a suspended porous receptacle, of felt or other fibrous material, through which fluids will percolate, for the purpose herein specified.

WILLIAM BELLAMY.

Witnesses:
   MICHAEL CONROY,
   JOHN DAVIDSON.